United States Patent [19]

Harding et al.

[11] Patent Number: 4,624,299
[45] Date of Patent: Nov. 25, 1986

[54] METHOD OF INDIRECT LIQUID-PHASE HEAT TRANSFER

[75] Inventors: Ronald H. Harding, Westport, Conn.; George E. Totten, West Haverstraw, N.Y.

[73] Assignee: Union Carbide Corporation, Danbury, Conn.

[21] Appl. No.: 749,783

[22] Filed: Jun. 28, 1985

[51] Int. Cl.$^4$ .......................... F28F 23/00; C09K 5/00
[52] U.S. Cl. ...................................... 165/1; 165/104.19;
252/52 A; 252/73; 252/77; 252/78.1; 568/580;
568/581; 568/582; 568/617; 568/622; 568/625
[58] Field of Search ............... 252/52 A, 73, 77, 78.1;
165/1, 104.19; 568/580, 581, 582, 617, 622, 625

[56] References Cited

U.S. PATENT DOCUMENTS

| | | | |
|---|---|---|---|
| 2,481,278 | 9/1949 | Ballard et al. | 260/615 |
| 2,520,611 | 8/1950 | Roberts et al. | 260/615 |
| 2,665,312 | 1/1954 | Ohlmann et al. | 260/611.5 |
| 2,687,378 | 8/1954 | Goldschmidt et al. | 252/51.5 |
| 2,786,080 | 3/1957 | Patton, Jr. | 568/582 |
| 3,185,735 | 5/1965 | Leis et al. | 260/611.5 |
| 3,324,035 | 6/1967 | Nankee et al. | 568/625 |
| 3,352,824 | 11/1967 | Mauz et al. | 260/45.75 |
| 3,629,111 | 12/1971 | Cramer | 252/75 |
| 3,829,506 | 8/1974 | Schmolka et al. | 260/615 B |
| 4,259,405 | 3/1981 | Newkirk et al. | 428/395 |
| 4,343,616 | 8/1982 | Decker et al. | 8/115.6 |

FOREIGN PATENT DOCUMENTS

| | | |
|---|---|---|
| 928283 | 6/1973 | Canada . |
| 31459 | 3/1979 | Japan . |
| 1097491 | 1/1968 | United Kingdom . |

*Primary Examiner*—Paul Lieberman
*Assistant Examiner*—Robert A. Wax
*Attorney, Agent, or Firm*—Karen E. Klumas

[57] ABSTRACT

A method of indirect liquid phase heat transfer which comprises continuously circulating between a heat generating and a heating source or water-soluble or water-dispersible polymer having a viscosity of less than about 100 centistokes at 100° F., of the formula:

$$R(OAR')_x$$

wherein
R is a $C_5$ to $C_{36}$ linear branched or alicyclic aliphatic hydrocarbyl group;
O is oxygen;
A is a polyoxyalkylene residue having oxyalkylene units derived from ethylene oxide or ethylene oxide and at least one other lower alkylene oxide having 3 or 4 carbon atoms;
R' is hydrogen, a $C_1$ to $C_8$ alkyl group or nonbornyl; and
x is an integer having a value of 1 to 6, wherein for values of x greater than 1 each AR' may be the same or different.

21 Claims, 2 Drawing Figures

METHOD OF INDIRECT LIQUID-PHASE HEAT TRANSFER

BACKGROUND OF THE INVENTION

1. Field of the Invention

This invention relates to a method of indirect liquid-phase heat transfer using as a heat transfer fluid in a high temperature, continuously circulating system a substantially anhydrous composition comprising a polyalkoxylated monohydric or polyhydric $C_5$ to $C_{36}$ aliphatic alcohol having a viscosity of less than about 100 centistokes, preferably from about 20 to about 60 centistokes at 100° F.

2. Prior Art Discussion

Ideally, an indirect liquid phase heat transfer fluid suitable for use in a high temperature, continuously circulating system should provide a broad range of service temperatures, have a sufficiently low viscosity to provide an acceptable rate of heat transfer and minimized operating expenses, have a sufficiently low freezing point to reduce start-up and pumping problems at lower temperatures, have sufficient lubricity that stress on pumps, valves and other system parts is minimized, decompose at a desirably slow rate in use, and resist the formation of system-fouling degradation products. Moreover, for convenient handling, clean-up and disposal it is desirable that the compositions be environmentally non-hazardous and water-soluble.

Numerous compositions have been suggested for use as indirect liquid-phase heat transfer fluids. Exemplary of some of these compositions are petroleum oils; synthetic aromatic hydrocarbons such as the phenylene oxides and diphenylene oxides disclosed in U.S. Pat. No. 1,905,850, the terphenyls disclosed in U.S. Pat. No. 2,033,702, and the phenoxybiphenyls and phenoxyterphenyls disclosed in U.S. Pat. No. 3,957,666; and polyalkylene glycol type copolymers of ethylene oxide and propylene oxide having molecular weights of from about 400 to about 1,200, such as the polymers of UCON® HTF-500 heat transfer fluid available from Union Carbide Corporation, described in the product brochure entitled "UCON® Heat Transfer Fluid 500" published in 1981, and Poly-G WS-280X available from Olin Corporation, described in the product brochure entitled "Poly-G WS-280X Heat Transfer Fluid", published in 1982.

Of the previously cited fluids, petroleum oils are the least desirable. These compositions generally have rapid rates of thermal degradation, low flash points, high vapor pressures, low thermal efficiency, tend to form system-fouling varnishes and sludges as degradation products and, owing to their water insolubility and potential toxicity present clean-up and disposal problems.

Unlike petroleum oils and polyalkylene glycols, synthetic aromatics have the advantage of providing a broad range of service temperatures, oftentimes up to about 700° F. However, these compositions have disadvantageously low flash points, (typically below operating temperatures, necessitating the use of pressurized systems capable of separating the fluid from air), present potential toxicity problems, and are relatively poor lubricants.

For systems operating at temperatures up to about 500° F., water-soluble polyalkylene glycols stabilized by the addition thereto of at least one antioxidant are the indirect liquid-phase heat transfer fluids of choice. At these service temperatures polyalkylene glycols have low viscosities, relatively slow rates of thermal degradation, high thermal efficiency, excellent lubricity and resistance to the formation of system-fouling degradation products. At temperatures in excess of 500° F., however, the previously cited polyalkylene glycols available as heat transfer fluids tend to decompose at relatively rapid rates.

The relative stability of a polymer in use as a heat transfer fluid may be considered in relation to viscosity changes as function of time at a given temperature. After a certain period of elevated temperature use petroleum oils, synthetic aromatic hydrocarbons and polyalkylene glycols all experience viscosity increases as a result of thermal and oxidative degradation, however, it is the rate of viscosity increase which limits the useful service life of a polymer at a particular temperature. The rate at which viscosity increases is also generally indicative of the thermal efficiency of a polymer, the coefficient of thermal conductivity varying approximately inversely with the square root of viscosity.

FIG. 1, attached hereto, is illustrative of the viscosity changes with time of UCON® HTF-500 heat transfer fluid, a 1-butanol initiated polyalkylene glycol having an average molecular weight of about 1100, and Therminol® 66 heat transfer fluid, a modified terphenyl, available from Monsanto Co., at both 500° F. and 550° F. as per the Thermal Stability Test defined in the section entitled "Examples" infra. At temperatures of about 500° F. UCON® HTF-500 heat transfer fluid experiences initial viscosity decreases with time, whereas, Therminol® 66 heat transfer fluid continuously increases in viscosity at a relatively steady rate. As a general rule, fluids having viscosities of less than about 100 centistokes at 100° F. normally require replacement when their viscosity in use increases by about 20 to 30 percent. At service temperatures of about 500° F., UCON® HTF-500 heat transfer fluid experiences initial viscosity losses with the formation of some volatile, non-fouling degradation product. Until the fluid undergoes viscosity increasing degradation (i.e., some point in time beyond the scale depicted in FIG. 1) a system containing UCON® HTF-500 heat transfer fluid may be maintained by venting off volatiles and adding small amounts of replacement fluid as needed. In contrast thereto, Therminol® 66 heat transfer fluid, which cannot be so maintained, is generally used until sludge formation or viscosity increases necessitate complete fluid replacement and equipment cleanout. At temperatures of about 550° F. the relatively rapid rate of thermal decomposition of UCON® HTF-500 heat transfer fluid obviates its lower temperature advantages.

Apart from the addition of antioxidants, other methods for improving the thermal stability of polyoxyalkylene-containing compounds have been suggested. Canadian Pat. No. 928,283 discloses that the thermal stability of polyoxyalkylene compounds may be increased by the incorporation of an amino group into the polymeric chain. However, at temperatures in excess of about 500° F., nitrogen containing polyoxyalkylene compounds tend to decompose at undesirable rates and/or to form undesirable varnishes and/or sludges as degradation products (see Comparative Example C2).

The presence of an aromatic moiety has also been linked to the stability of polyokyalkylene-containing compounds. Alkoxylated alkyl phenols have been found to provide fluids having somewhat superior thermal stability, as compared to otherwise identical polyalkylene glycols lacking an aromatic moiety. Alkoxylated octyl phenols such as compositions available under the tradename Triton ® X-100, available from Rohm and Haas Co., have been utilized as heat transfer fluids in solder blanketing operations, however, in continuously circulating systems such compositions generally develop undesirably high viscosities, typically, in excess of 100 Centistokes at 100° F. (see Comparative Examples $C_5$ and $C_6$ for thermal stability data of ethoxylated nonyl phenols).

A heat transfer fluid having the thermal stability advantages exhibited by polyalkylene glycol type fluids at temperatures up to about 500° F., useable at service temperatures in excess of about 500° F. is highly desirable.

SUMMARY OF THE INVENTION

This invention is directed to a method of indirect liquid-phase heat transfer which comprises continuously circulating between a heat generating and a heat using source a heat transfer fluid which comprises a substantially anhydrous polymer having a viscosity of less than about 100 centistokes at 100° F., preferably from about 20 to about 60 centistokes at 100° F., of the formula:

$$R(OAR')_x$$

wherein

R is a $C_5$ to $C_{36}$, preferably $C_8$ to $C_{18}$, and most preferably $C_{12}$ to $C_{14}$ linear, branched or alicyclic, preferably linear or branched, hydrocarbyl group;

O is oxygen;

A is a polyoxyalkylene residue having units derived from ethylene oxide or ethylene oxide and at least one other lower alkylene oxide having 3 or 4 carbon atoms;

R' is selected from the group consisting of hydrogen, $C_1$ to $C_8$ alkyl groups and norbornyl groups; and x is an integer having a value of 1 to 6, preferably 1 to 3, wherein for values of x greater than 1 each OAR' may be the same or different. Included among the polymers of this invention are compositions recognized in the art as surfactants.

In a preferred embodiment the heat transfer fluid of this invention is stabilized by the presence of at least one stabilizer. For purposes of this invention, a "stabilizer" is defined as a composition, e.g. antioxidant or free radical inhibitor which reduces the rate of thermal degradation of the polymers of this invention. A "stabilized" fluid is defined as a fluid containing an effective amount of at least one stabilizer to provide the fluid with (a) a viscosity loss or (b) a viscosity gain of less than about 20%, preferably less than about 10% and most preferably less than about 5%, about 500 hours under Standard Conditions, at temperatures of about 500° F., preferably about 550° F.

For purposes of this invention "Standard Conditions" are defined as the conditions of the Thermal Stability Test defined in the section entitled "Examples" infra. A "substantially anhydrous" polymer is defined as a polymer containing less than 1.0 weight percent of water.

DETAILED DESCRIPTION OF THE INVENTION

Figure 1:
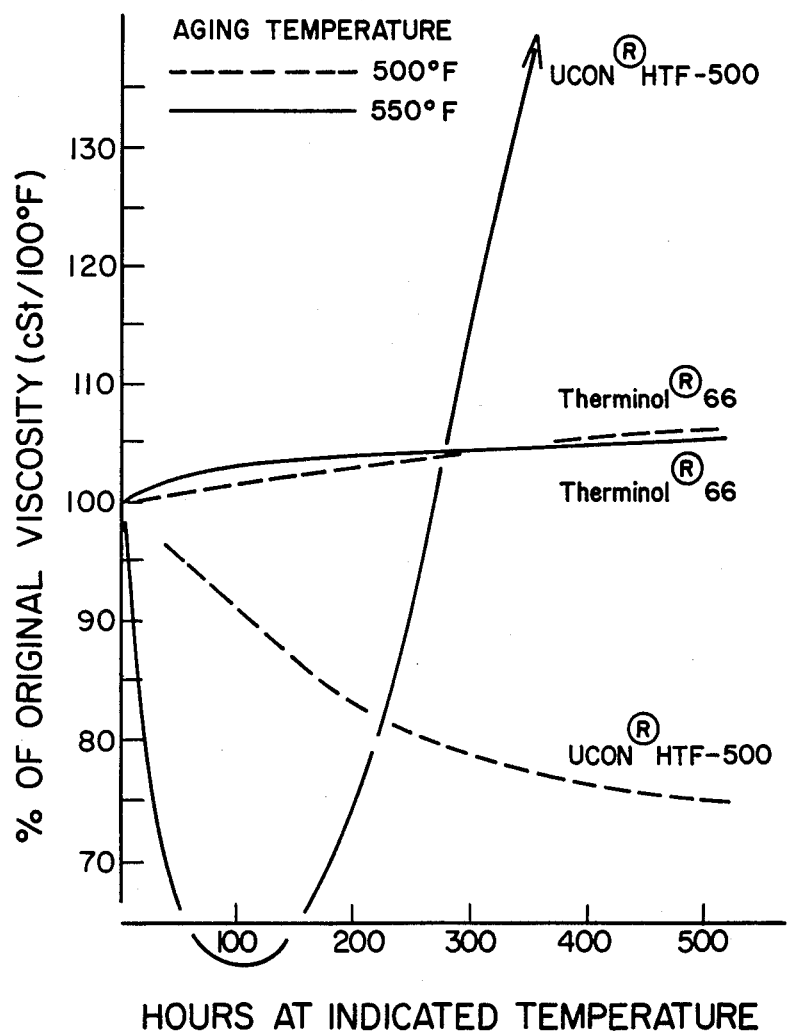
Figure 2:
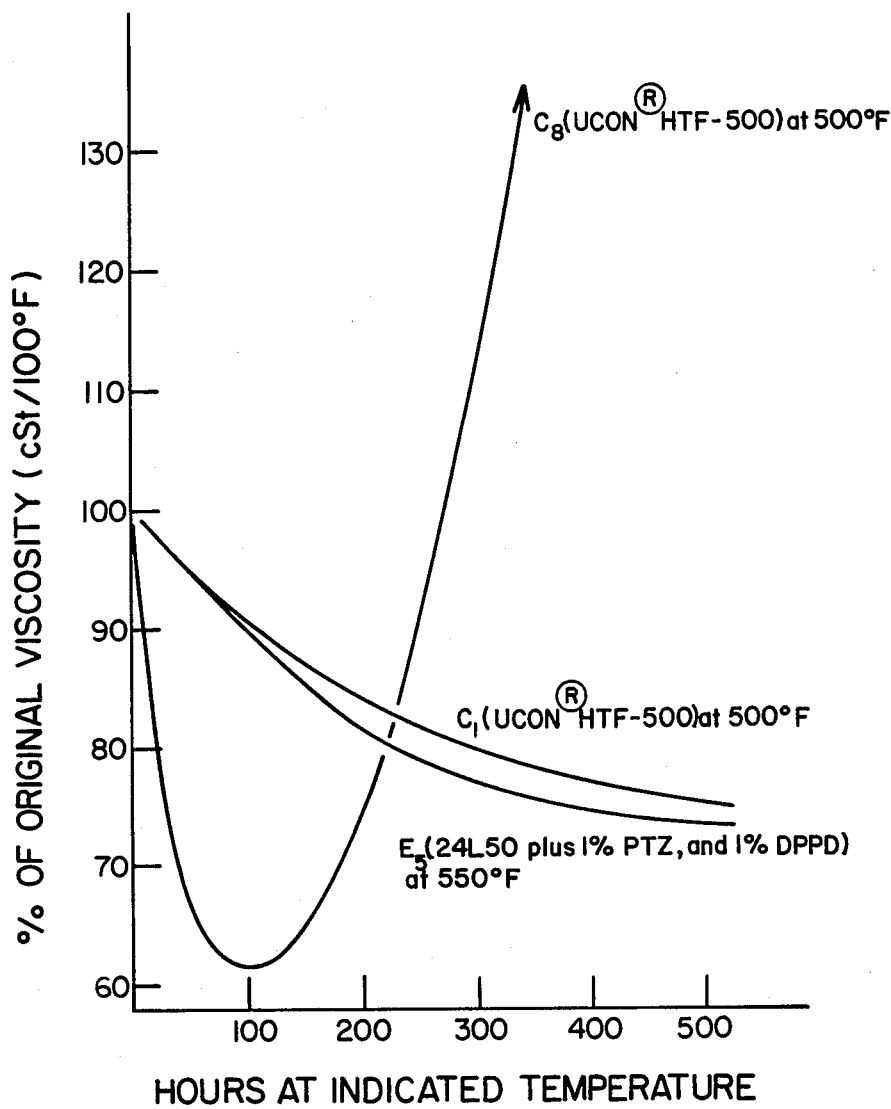

Several of the polymers of this invention are included among the polyether polyols broadly disclosed by U.S. Pat. Nos. 2,665,312 and 3,185,735. The above cited patents provide extensive listings of widely diverse applications, e.g., fiber treating agents, lubricants, heat transfer fluids, surfactants and the like, for the different types of polyols disclosed. The listings can not logically be construed as a disclosure that each of the polyols described has utility in every application provided. It is well known in the art that a particular application requires a polymer tailored to fit its individual requirements and that a polymer intended for one application is generally not readily employable in an entirely different application.

Accordingly, the prior art does not disclose or suggest that the polymers of this invention, particularly the surfactant type polymers, would be suitable for use as heat transfer fluids. While it is recognized in the previously cited art that the oxidative stability of polyoxyalkylene based compositions can often be somewhat increased by the incorporation therein of one or more antioxidants, and that certain antioxidants may be more effective at higher temperature than others, in view of the prior art it is both unobvious and unexpected that the oxidatively stabilized polymers of this invention would be suitable for use as heat transfer fluids, particularly at temperatures of about 500° F. or greater.

The heat transfer fluids of this invention include compositions produced by the alkoxylation of aliphatic monohydric or polyhydric alcohols. The aliphatic alcohols include linear, branched or alicyclic compounds having primary, secondary or tertiary hydroxyl groups.

Monohydric alcohols include linear compounds having a primary hydroxyl group such as 1-octanol, 1-nonanol, 1-decanol, 1-dodecanol, 1-hexadecanol, and the like; linear compounds having a secondary hydroxyl group such as 2-octanol, 2-dodecanol, 4-tetradecanol, 6-heptadecanol, and the like; branched alcohols having a primary hydroxyl group such as 2-methyl-1-undecanol, 2-methyl-1-dodecanol, 2-methyl-1-tetradecanol, 2-ethyl-1-hexanol, 2-ethyl-1-decanol, 2-ethyl-1-dodecanol, 2,4,5,5,7 pentamethyl-1-octanol, 2,3,5,7-tetramethyl-1-nonanol, and the like; branched alcohols having a secondary hydroxyl group such as 4-methyl-2-pentanol, 2,6-dimethyl-4-heptanol, 7-ethyl-2-methyl-4-undecanol, 3,9-diethyl-6-tridecanol, 2,4,8-trimethyl-4-nonanol and the like; cyclic structures such as cyclohexanol, cyclooctanol, 2-methylcyclohexanol, 3-methyl-cyclohexanol, 4-methyl-cyclohexanol and the like. Mixtures of such alcohols including commercially available alcohols which normally comprise higher and lower molecular weight alcohols in a given cut are also suitable for use herein. Linear and branched primary alcohols and alcohol mixtures particularly those alcohols produced by the "oxo" reaction of normal $C_7-C_{19}$ olefins are preferred monohydric alcohols. Particularly preferred monohydric alcohols are linear compounds having a primary hydroxy group.

Polyhydric alcohols include diols such as 1,2-octane diol, 1,2-decane diol, 1,7-heptane diol, 1,8-octane diol, 1,10-decane diol, 2-ethyl-1,3-hexane diol, and the like, polyols having both primary and secondary hydroxyl groups such as 1,2,6-hexane triol, sorbitol, mannitol and the like; polyols having functional hydroxyl groups covalently bonded through a chain of atoms to a single central atom or backbone chain such as 1,1,1 trimethylol propane, pentaerythritol, dipentaerythritol and the like; and polyalkylene glycols having molecular weights of from about 300 to about 900 such as polypropylene glycol having units derived from 1,2- or 1,3-propylene oxide and polybutylene glycol having units derived from 1,2-, 1,3- or 1,4-butylene oxide.

The aliphatic alcohols are alkoxylated with ethylene oxide or ethylene oxide and at least one another alkylene oxide to produce a polymer having an alcohol derived segment with one or more polyalkylene oxide chains attached thereto. Alkylene oxide polymerization monomers other than ethylene oxide include lower alkylene oxides, preferably alkylene oxides having less than 5 carbon atoms such as, 1,2 propylene oxide, 1,3 propylene oxide, 1,2 butylene oxide, 1,4 butylene oxide, 2,3 butylene oxide, and the like; as well as hydroxy substituted epoxides such as glycidol and the like.

The percent by weight of oxyethylene units in the polyalkylene oxide chains of polymers of this invention is widely variable, however, for purposes of this invention it is required that sufficient oxyethylene units be present to provide a water-dispersible or, preferably, a water-soluble polymer. In general, a polyoxyalkylene chain of polymer may contain from about 25% to about 100% by weight, preferably from about 50% to about 100% by weight, and most preferably 100% by weight of oxyethylene units, based on the total weight of oxyalkylene units in the polyoxyalkylene chain.

The configuration of a polyalkylene oxide chain is determined by reactant monomer selection. Monomers which upon reaction provide an additional reactive site for chain growth (e.g., glycidol) are termed branching monomers and produce a chain which is defined herein as "branched". For purposes of this invention, chains which result from the polymerization of ethylene oxide and 1,2-alkylene oxides (i.e., polyalkylene oxide chains having alkyl side groups), are defined as "linear". Reactant monomers which produce linear alkylene oxide chains (herein defined as "linear polymerization monomers") are preferred. Linear polymerization monomers which upon polymerization produce chains having primary hydroxyl groups are especially preferred (e.g., ethylene oxide, 1,3-propylene oxide, 1,4 butylene oxide, etc.).

The average length of a polyalkylene oxide chain is subject to wide variation in direct proportion to the amount of reactant monomer utilized. The extent of polymerization is limited, however, by the viscosity of the result polymer. Extremely long alkylene oxide chains provide a viscous polymer wherein the coefficient of heat transfer is typically undesirably reduced.

It should be noted that alkylene oxide-type polymerization monomers exhibit greater reactivity towards primary hydroxyl than secondary hydroxyl groups. Accordingly alkoxylated aliphatic polyols having for example both primary and secondary hydroxyl groups (e.g., 1,2,6-hexane triol) may be expected to contain alkylene oxide chains of varying length. In general, the average number of oxyalkylene groups per molecule of polymer ranges from about 3 to about 40, preferably from 5 to about 12, and most preferably from about 6 to about 8 with alkoxylated polyhydric alcohols tending to have greater numbers of shorter alkylene oxide chains than monohydric alcohols. The number average of oxyalkylene groups per molecule of alcohol represents a statistical average over a large number of molecules, with a given alkoxylated product having a certain percentage of chains of both longer and shorter length.

The polyoxyalkylene-containing polymers of this invention may be capped (i.e. terminated) with hydrocarbon end groups including $C_1$ to $C_8$ alkyls such as methyl ethyl, t-butyl, neopentyl and the like, as well as norbornyl groups and the like; provided that such end groups do not produce polymers having viscosities exceeding 100 centistokes at 100° F.

Preparation of alkoxylated aliphatic alcohols is well known. The polymer producing reactions may be carried out in the presence of such suitable adjuvants, solvents, stabilizers and catalysts as are known in the art. Conventional catalysts include alkali or alkaline earth metals or their corresponding hydroxides and alkoxides, Lewis acids, crown ethers, mineral acids, and the like. Catalysts are generally present in amounts of from about 0.0001 to about 1.0 weight percent, preferably about 0.01 to about 0.1 weight percent, and most preferably about 0.02 to about 0.05 weight percent of the resultant polymer product. Generally such reactions are conducted at temperatures of from about 50° to 300° C., preferably at 90° to 180° C. and most preferably at 110° to 150° C. The reactions may be conducted at inert atmospheric or inert super atmospheric pressures, preferably from about 5 to about 100 psig (about 0.2 to about 7 atmosphere gauge) and most preferably from about 40 to about 80 psig (about 2.5 to about 6 atmosphere gauge). The reactant monomers may be added to the aliphatic alcohol directly or sequentially to produce block or random arrangements of alkylene oxide derived groups in the polyoxyalkylene chain(s).

Capped polymers may be produced by several methods depending upon the terminal end group desired. For example, norbornyl capping may be achieved by reacting a polyoxyalkylated alcohol with norborborene in the presence of an acidic catalyst such as is described in U.S. Pat. No. 4,412,926, incorporated herein by reference. Alkyl capping may be accomplished by several well known methods such as the acetylation followed by the reduction of primary hydroxyl groups of alkoxylated alcohols, Williamson synthesis, dehydroformalation and the like.

While it is contemplated that mixtures of alkoxylated alcohols may be useably employed in the practice of this invention it has been found that in numerous instances the use of compounds having a narrow molecular weight distribution of product (i.e., product having fewer longer and shorter chain alkoxylated aliphatic alcohols) provides a particularly desirable heat transfer fluid. For purposes of this invention a narrow molecular weight distribution product is defined as a product having few longer and shorter chain alkoxylated aliphatic alcohols than a product produced by a reaction wherein a potassium hydroxide catalyst is employed.

The narrow molecular weight distribution alkoxylated aliphatic alcohols may be produced by numerous processes. For example, U.S. patent application Ser. No. 621,991 filed on June 22, 1984 in the names of Robert John Knopf and Louis Foster Theiling, Jr., a continuation-in-part of U.S. patent application Ser. No. 510,804 filed on July 5, 1983, now abandoned, both incorporated herein by reference, discloses the production of narrow molecular weight distribution alkoxylation products using calcium-containing catalysts. The alkoxylation catalyst disclosed by the application is a calcium containing catalyst of the formula $Ca(XR^3H)_p$ wherein p is one or two, $XR^3H$ is an organic-containing residue of an organic compound having an active hydrogen, and X is oxygen, nitrogen, sulfur or phosphorus. The catalyst is modified by a strong, inorganic acid (e.g., sulfuric acid) provided in an amount of about 0.2 to 0.9, often, about 0.45 to 0.75 times the amount required for neutralization. Similarly, U.S. patent application Ser. No. 555,410 filed on Nov. 28, 1983 in the names of James Hernden McCain, Jr., Donald Joseph Foster and, a continuation-in-part of U.S. patent application Ser. No. 079,497 filed on Sept. 27, 1979, now abandoned, both incorporated herein by reference discloses a process whereby catalysts useful for producing narrow molecular weight distributions of oxyalkylated reactive hydrogen compounds are disclosed. The catalyst disclosed are prepared by reacting an alkaline earth metal selected from the group consisting of calcium, strontium and barium and mixtures thereof with a lower anhydric alcohol having 1 to 7 carbon atoms at a temperature sufficient to form a lower alcohol metal alkoxide, mixing a polyol or higher monohydric alcohol having at least 4 carbon atoms with the lower alcohol-alkaline earth metal alkoxide reaction product and removing the lower alcohol therefrom.

Stabilizers suitable for reducing the rate of thermal and oxidative degradation of alkoxylated alcohols include phenolic compounds such as 2,2 di(4-hydroxyphenyl)propane, phenothiazine, 3,7-dioctyl phenothiazine, phenothiazine carboxylic acid esters, phenothiazines, such as N-ethyl phenothiazine, N-phenylphenothiazine, etc.; polymerized trimethyldihydroquinoline; amines, such as phenyl-α-napthylamine, phenyl-β-napthylamine, N,N'-dioctyldiphenylamine, N,N'-diphenyl-p-phenylene diamine, N,N'-di-β-naphthyl-p-phenylene diamine, p-isopropoxy diphenylamine, N,N'-dibutyl-p-phenylene diamine, N,N'-bis(1,4-dimethylpentyl)-p-phenylene diamine, N,N'-diisopropyl-p-phenylene diamine, p-hydroxydiphenylamine, etc.; hindered phenols such as dibutyl cresol, 2,6-dimethyl-p-cresol, butylated 2,2-di-(4-hydroxyphenyl)propane, N-butylated aminophenol, etc.; butylated hydroxyanisoles, such as 2,6-dibutyl-p-hydroxyanisole; anthraquinone; dihydroxyanthraquinone; hydroquinone; 2,5-ditertiary butylhydroquinone; 2-tertiary butylhydroquinone; quinoline; p-hydroxydiphenylamine; phenylbenzoate; p-hydroxyanisol; nordihydroguaiaretic acid; pyrocatechol; styrenated phenol; polyalkyl polyphenols; propyl gallate; sodium nitrite, etc. Mixtures of the above mentioned stabilizers may be employed if desired. Stabilizers which provide an alkoxylated aliphatic alcohol with no more than trace amounts of varnishes and/or sludges as degradation products after 500 hours of continuous use at temperatures of about 500° F., preferably 550° F. as per the Thermal Stability Test defined infra, are particularly desirable. Stabilizers selected from the group consisting of N,N'-diphenyl-p-phenylenediamine, phenothiazine, propyl gallate, and 3,7-dioctylphenothiazine are particularly well suited for use herein. Stabilizers combinations of phenothiazine or 3,7-dioctylphenothiazine and at least one other antioxidant, preferably N,N'-diphenylphenylenediamine, are preferred.

Other stabilizers are contemplated for use herein, the invention not being limited to the combination of the previously described polymers with those stabilizers disclosed or known, but encompassing the use of any stabilizer or stabilizer combination which enhances the oxidative and/or thermal degradation resistance of said polymers.

Typically, the stabilizers are present in the fluids of this invention in an amount of from about 0.1 to about 10.0% by weight, based upon the weight of the polymer, and oftentimes are present in an amount of from about 0.5 to about 2.0 percent by weight based on the weight of the polymer. Desirably the stabilizer has a solubility of at least 25 grams per liter of composition at 25° C.

In a preferred embodiment this invention relates to a method of indirect heat transfer which comprises continuously circulating between a heat generating and a heat using source a heat transfer fluid comprising a 5 to 12 mole ethoxylate of a $C_{12}$ to $C_{14}$ linear, aliphatic monohydric alcohol, and a thermally stabilizing amount of at least one stabilizer, preferably a combination of phenothiazine or 3,7-dioctylphenothiazine, and N,N'-diphenyl phenylenediamine.

This invention is also directed to the above described fluid wherein an effective amount of stabilizer is provided to produce a fluid which after 500 continuous hours of use as per the Thermal Stability Test at a system temperature of about 550° F. in a substantially inert, oxygen free atmosphere yields no more than trace amounts of varnishs and sludges and provides a composition having a viscosity increase not exceeding 10 percent of its initial viscosity.

Additives for corrosion control including at least one steel corrosion inhibitor such as a phosphate ester, dimer acid, alkyl succinic anhydride, and the like; and at least one copper corrosion inhibitor such as tolyltriazole, mercaptobenzothiazole, and the like, may also be incorporated into the compositions of this invention.

The fluids are prepared by blending the various components to a homogeneous state by any conventional mixing means. Although it is not necessary to heat the solutions, gentle warming at temperatures of about 30° C. to 60° C. may facilitate dissolution of some solid stabilizers. While generally there is little incentive to use mixtures of the compositions of this invention with polyalkylene glycol-type heat transfer fluids, since the performance will be limited by the poorer performing polyalkylene glycol-type fluid, it is recognized that the heat transfer fluid of this invention can be added to existing heat transfer fluids based on polyalkylene glycols.

The following examples serve to illustrate the specific embodiments of this invention. It is not intended that the scope of the invention shall be limited by these examples. The designations which appear in the example and tables below have the following meanings:

PANA: phenyl-α-naphthylamine
PTZ: phenothiazine
DPPD: N,N'-diphenyl phenylenediamine
PrG: Propyl gallate
PEG-400: A poly(ethylene glycol) having an average molecular weight of about 400, available from Union Carbide Corporation.
24L50: An average 7-mole ethylene oxide adduct of a $C_{12}$–$C_{14}$ linear primary alcohol, available from Union Carbide Corporation.
15S7: An average 7-mole ethylene oxide adduct of a $C_{11}$–$C_{15}$ branched secondary alcohol, available from Union Carbide Corporation.
NP-7: An average 7-mole ethylene oxide adduct of nonylphenol, available from Union Carbide Corporation.
NP-10 capped: An average 9-mole ethylene oxide adduct of nonylphenol end capped with a methyl group.
24L50 capped: The methyl-capped derivative of an average 6-mole ethylene oxide adduct of a $C_{12}$–$C_{14}$ linear primary alcohol.
24L(6E+P): A random alkylene oxide adduct of a $C_{12}$–$C_{14}$ linear primary alcohol containing 6 moles of ethylene oxide and 1 mole of propylene oxide.

24L50 N: An average 7-mole ethylene oxide adduct of a $C_{12}$-$C_{14}$ ethoxylated primary alcohol having a narrow distribution of molecular weight produced by a process employing a calcium oxide catalyst.

Therminol ® 66 A modified terphenyl available from Monsanto Corporation.

UCON ® HTF-500 A PANA stabilized 1-butanol initiated ethylene oxide/propylene oxide copolymer having a molecular weight of about 1100, available from Union Carbide Corporation.

Jeffamine ® ED-900 An average 900 molecular weight primary diamine derived from propylene oxide-capped polyethylene glycol available from Jefferson Chemical Corporation.

EXAMPLES

The thermal stability of various compositions was tested by means of the following Thermal Stability Test. Into a 700 ml cylindrical glass flask having a diameter of about 7 cm equipped with a first side arm connect to a nitrogen inlet and a second side arm connected to a conventional air-cooled condenser, was charged approximately 360 gms of the fluid to be tested. A thermocouple capable of continuously monitoring the temperature of the flask was inserted through the top of the flask and positioned approximately 4 cm from the bottom of the flask. The thermocouple was connected to a heating source surrounding the bottom and sides of the flask that maintained the system at a constant preselected system temperature. A nitrogen sparge of 1 cc/min created an inert atmosphere over the fluid sample and provided a means of fluid agitation. The test was run for a period of about 500 hours at a selected system temperature of about 500° F. or 550° F.

For purposes of describing the by-products produced by this test the following definitions shall apply:

Varnish—A thin adherent film of solid black charred film found on the wall of a container near the fluid surface. The amount of varnish observed is rated according to the width of the black band remaining on the container wall after the fluid is removed and the container rinsed with acetone. Ratings are as follows:
  None: No visible band
  Trace: Up to a ¼ inch band
  Slight: ¼ to ¾ inch band
  Medium: ¾ to 1¾ inch band
  Heavy: A band in excess of 1¾ inch Sludge—Fine black char particles formed individually within the fluid during aging. When particles are too fine to settle or the fluid too viscous to facilitate particle settling within a day after the test, the product is reported as a "dispersed" sludge. The amount of sludge observed following particle settling is rated as follows:
  None—Fluid essentially free of char particles
  Trace—Partial coverage of container bottom by a very thin sludge layer (dry solids content estimated at about 0.01 weight percent of sample)
  Slight—Thin sludge layer covers container bottom (dry solids content estimated at about 0.02 weight percent of sample)
  Medium—thicker sludge layer on container bottom (dry solids content estimated at about 0.04 weight percent of sample).

EXAMPLES 1 AND 2 AND COMPARATIVE EXAMPLES $C_1$ TO $C_3$

The compositions listed in the following table were subjected to the Thermal Stability Test for a 500 hour period at a system temperature of about 500° F. The results of the test are provided in Table I.

TABLE I

| Example | Composition | % Antioxidant | Initial viscosity (Cst at 100° F.) | % loss (gain) in viscosity after 500 hours at 500° F. | Solids formed varnishes | sludges |
|---|---|---|---|---|---|---|
| $C_1$ | UCON ® HTF-500 | 2% PANA | 59 | 25 | medium | none |
| $C_2$ | Jeffamine ® ED-900 | 2% PTZ | 69 | (50)[1] | medium | dispersed |
| $C_3$ | PEG-400 | 2% DPPD | 48 | (2) | medium | none |
| 1 | 24L50 | 2% DPPD | 31 | 2 | trace | slight |
| 2 | 24L50 | 1% PTZ, 1% DPPD | 31 | 4 | slight | slight |

[1] After 260 hours.

EXAMPLES 3 TO 9 AND COMPARATIVE EXAMPLES $C_4$ TO $C_8$

The compositions listed in the following table were subjected to the Thermal Stability Test for a 500 hour period at a system temperature of about 550° F. The results of the test are provided in Table II.

FIG. II attached hereto is illustrative of the viscosity changes with time of Example 5 and Comparative Examples $C_1$ and $C_8$ as per the Thermal Stability Test, at designated temperatures of 500° or 550° F.

TABLE II

| Example | Polymer | % Antioxidant | Initial viscosity (Cst at 100° F.) | % loss (gain) in viscosity after 500 hours at 550° F. | Solids formed varnishes | sludges |
|---|---|---|---|---|---|---|
| $C_4$ | Therminol ® 66 | — | 35 | (5) | medium | none |
| $C_5$ | NP-7 | 1% DPPD, 1% PTZ | 110 | (450)[1] | slight | trace |
| $C_6$ | NP-10 capped | 1% DPPD, 1% PTZ | 32 | (145) | trace | none |
| $C_7$ | PEG-400 | 2% DPPD | 48 | syrup | heavy | dispersed |
| $C_8$ | UCON ® HFT-500 | 2% PANA | 58 | syrup | medium | dispersed |
| 3 | 24L50 | 2% DPPD | 32 | (13) | heavy | dispersed |
| 4 | 24L50 | 2% PrG | 33 | 21 | slight | slight |
| 5 | 24L50 | 1% PTZ, 1% DPPD | 31 | 26 | slight | slight |
| 6 | 24L50N | 1% DPPD, 1% PTZ | 28 | 27 | trace | none |
| 7 | 24L50 + cap. | 1% PTZ, 1% DPPD | 9 | (1) | slight | trace |

TABLE II-continued

| Example | Polymer | % Antioxidant | Initial viscosity (Cst at 100° F.) | % loss (gain) in viscosity after 500 hours at 550° F. | Solids formed varnishes | sludges |
|---|---|---|---|---|---|---|
| 8 | 24L(6E + P) | 1% PTZ, 1% DPPD | 29 | (1) | slight | slight |
| 9 | 15S7 | 1% DPPD, 1% PTZ | 33 | 32 | slight | trace |

[1] After 430 hours.

What is claimed is:

1. A method of indirect liquid phase heat transfer which comprises continuously circulating between a heat generating and a heat using source a substantially anhydrous water-soluble or water-dispersible polymer having a viscosity of less than about 100 centistokes at 100° F., of the formula:

$$R(OAR')_x$$

wherein

R is a $C_5$ to $C_{36}$ linear, branched or alicyclic aliphatic hydrocarbyl group;

O is oxygen;

A is a polyoxyalkylene residue having oxyalkylene units derived from ethylene oxide or ethylene oxide and at least one other lower alkylene oxide having 3 or 4 carbon atoms;

R' is selected from the group consisting of hydrogen, $C_1$ to $C_8$ alkyl groups and norbornyl groups; and x is an integer having a value of 1 to 6 wherein for values of x greater than 1 each OAR' may be the same or different.

2. The method of claim 1 wherein the average number of oxyalkylene units per molecule of polymer ranges from about 3 to about 40.

3. The method of claim 2 wherein the polymer contains from about 25 to about 100% by weight of oxyethylene units, based on the total weight of oxyalkylene units.

4. The method of claim 1 wherein a stabilizer capable of reducing the rate of thermal degradation of the polymer is also present.

5. The method of claim 4 wherein the stabilizer is present in an amount of from about 0.1 to about 10 weight percent based on the total weight of the polymer.

6. The method of claim 5 wherein the polymer is an alkoxylated monohydric aliphatic alcohol and the stabilizer is selected from the group consisting of N,N'-diphenyl-phenylene diamine, phenothiazine, propyl gallate and 3,7-dioctyl phenothiazine.

7. The method of claim 6 wherein the stabilizer comprises a combination of phenothiazine or 3,7-dioctyl phenothiazine, and at least one other stabilizer.

8. The method of claim 7 wherein the polyoxyalkylene residue consists essentially of units derived from ethylene oxide.

9. The method of claim 8 wherein R is the residue of a $C_8$ to $C_{18}$ linear or branched aliphatic alcohol, R' is hydrogen and the average number of oxyethylene groups per molecular ranges from about 5 to about 12.

10. A method of liquid-phase indirect heat transfer which comprises continuously circulating in an indirect heat exchange system a heat transfer fluid comprising a substantially anhydrous water-soluble or water-dispersible alkoxylated monohydric or polyhydric $C_5$ to $C_{36}$ aliphatic alcohol having a viscosity of less than about 100 centistokes at 100° F. and an effective amount of a stabilizer to provide (a) a viscosity loss or (b) a viscosity gain of less than about 30%, after 500 hours of continuous use as per the Thermal Stability Test wherein the system temperature is maintained at about 500° F.

11. The method of claim 10 wherein the alkoxylated alcohol is a linear or branched alcohol having at least one linear or branched oxyalkylene chain containing units derived from ethylene oxide or ethylene oxide and at least one other 3 to 4 alkylene oxide.

12. The method of claim 11 wherein the oxyalkylene chains are linear in structure.

13. The method of claim 12 wherein the fluid comprises a linear $C_{12}$ to $C_{14}$ alkoxylated monohydric alcohol and the average number of oxyalkylene units per molecule of alkoxylated alcohol ranges from about 5 to about 12.

14. The method of claim 13 wherein the oxyalkylene chain consists essentially of ethylene oxide derived units.

15. A method of liquid-phase indirect heat transfer which comprises continuously circulating in an indirect heat exchange system a heat transfer fluid comprising a substantially anhydrous water-soluble ethoxylated monohydric $C_{12}$ to $C_{14}$ aliphatic alcohol having a viscosity of from about 20 to about 60 centistokes at 100° F. and an effective amount of a stabilizer to provide a viscosity loss or (b) a viscosity gain of less than about 20%, after 500 hours of continuous use as per the Thermal Stability Test wherein the system temperature is maintained at about 550° F.

16. The method of claim 10 or 15 wherein the stabilizer is selected from the group consisting of phenothiazine, 3,7-dioctyl-phenothiazine, N,N'-diphenylenediamine and propyl gallate.

17. The method of claim 10, 14 or 15 wherein the stabilizer comprises phenothiazine or 3,7-dioctyl phenothiazine, and N,N'-diphenylenediamine.

18. The method of claim 15 wherein the alkoxylated alcohol has a narrow molecular weight distribution.

19. The method of claim 15 wherein the stabilizer is effective to provide no more than trace amounts of varnishes and/or sludges as degradation products after 500 hours of continuous use at a temperatures of about 550° F. as per the Thermal Stability Test.

20. The method of claim 10 or 15 wherein an effective amount of stabilizer to provide a (a) viscosity loss or (b) a viscosity gain of less than about 5%, after 500 hours of continuous use is provided.

21. A substantially anhydrous heat transfer composition comprising a 5 to 12 mole ethoxylate of a linear, monohydric, aliphatic alcohol having from 12 to 14 carbon atoms and a thermally stabilizing amount of a stabilizer selected from the group consisting of phenothiazine, 3,7-dioctylphenothiazine, N,N'-diphenylphenylene diamine, propyl gallate and mixtures thereof, wherein the composition after 500 continuous hours of use as per the Thermal Stability Test at a system temperature of 550° F. in a substantially inert, oxygen free environment yields no more than trace amounts of varnishes and sludges and provides a composition having a viscosity increase not exceeding 10 percent of its initial viscosity.

* * * * *